(No Model.)
W. P. DALLETT.
DRILLING MACHINE.
No. 397,701. Patented Feb. 12, 1889.
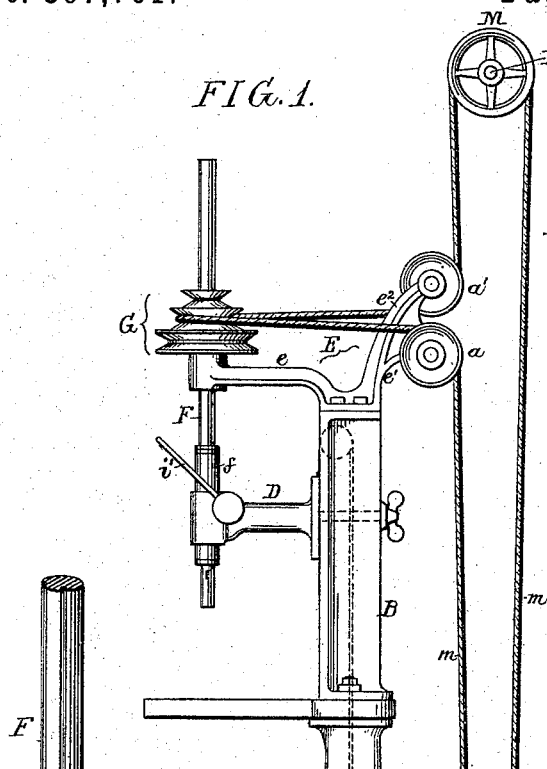
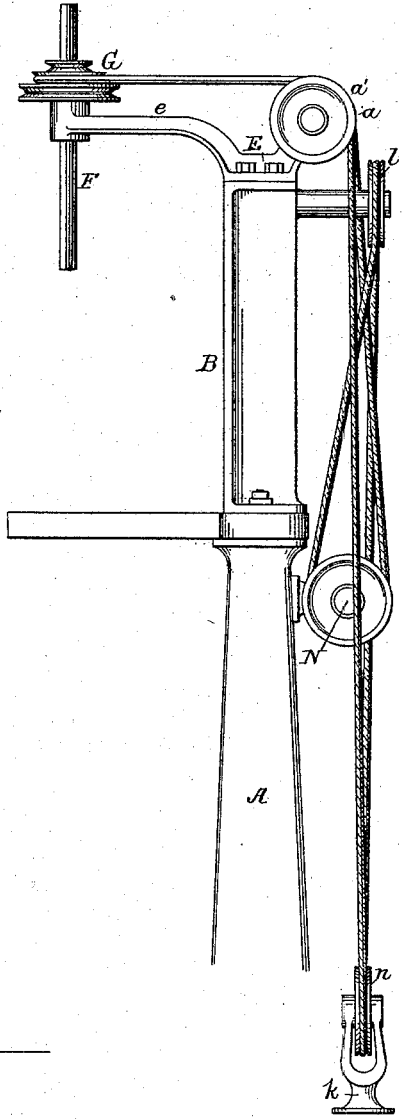
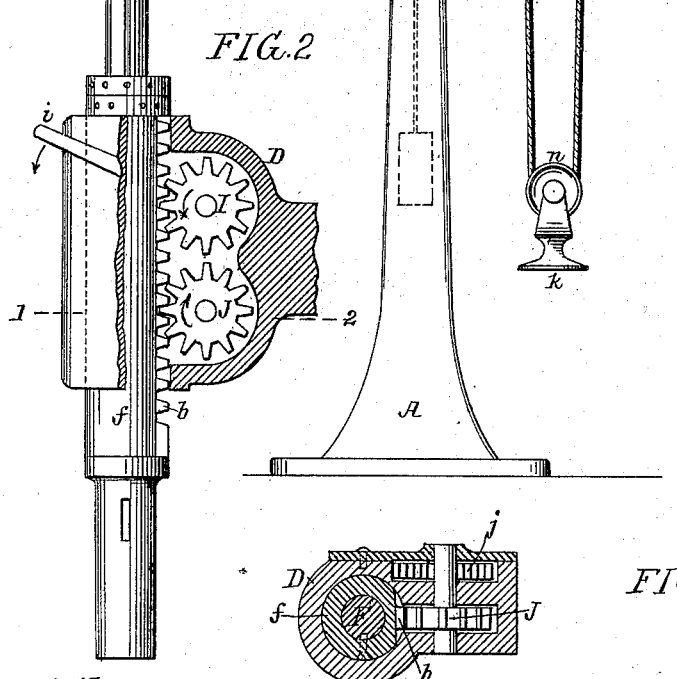
Witnesses:
Alex. Barkoff
William D. Bonner
Inventor
William P. Dallett
by his Attorneys
Howson & Howson

United States Patent Office.

WILLIAM P. DALLETT, OF PHILADELPHIA, ASSIGNOR TO HIMSELF, AND THOMAS H. DALLETT AND GEORGE A. DALLETT, BOTH OF THORNBURY, PENNSYLVANIA.

DRILLING-MACHINE.

SPECIFICATION forming part of Letters Patent No. 397,701, dated February 12, 1889.

Application filed November 12, 1888. Serial No. 290,606. (No model.)

*To all whom it may concern:*

Be it known that I, WILLIAM P. DALLETT, a citizen of the United States, and a resident of Philadelphia, Pennsylvania, have invented certain Improvements in Drilling-Machines, of which the following is a specification.

My invention relates to improvements in stationary drill-presses, more especially used for small work.
One object of my invention is to overcome in a simple manner the objection to the dropping of the drill-spindle, due to lost motion, between the fixed pinion and the rack of the spindle, and a further object is to provide means for automatically taking up the slack of the driving-belt, as fully described hereinafter.

In the accompanying drawings, Figure 1 is a side view of my improved drill-press. Fig. 2 is an enlarged view showing the counterbalancing and feeding devices for the drill-spindle. Fig. 3 is a section on the line 1 2, Fig. 2; and Fig. 4 is a view of a modified form of belt-driving gear.

A is the base of the drill-press.

B is a vertical standard, on which are mounted the spindle and its feeding mechanism, supported in the present instance by a bracket, D, which is held in position by a clamp-nut in the usual manner. This bracket, I prefer to counterbalance, as shown by dotted lines in Fig. 1, in order to prevent said bracket from falling when the securing-nut is removed. Carried by the standard B is a bracket, E, having three arms, $e$ $e'$ $e^2$. The arm $e$ acts as a guide for the upper portion of the drill-spindle F. The arms $e'$ $e^2$ carry studs on which are belt-wheels $a$ $a$. On the drill-spindle F is a cone-pulley, G. This pulley is splined to the spindle, so that the spindle will be turned by the said pulley, but can have an independent vertical movement.

On the drill-spindle is a sleeve, $f$, having teeth $b$, which engage with the teeth of the feed-pinion I, mounted in bearings in the brackets D. Directly below this pinion is a second pinion, J, also having its bearings in the bracket D. This pinion also engages with the teeth of the rack $b$. One end of a spring, $j$, Fig. 3, is secured to the pinion, and the opposite end is secured to the bracket. This spring tends to counterbalance the spindle, and consequently keeps the upper portion of the teeth of the pinion against the lower portion of the teeth of the rack, so that if the handle $i$ of the feed-pinion I is moved in the direction of its arrow, Fig. 2, the lower faces of the teeth of the pinion I will bear upon the upper faces of the teeth of the rack $b$. It will be seen that the rack is held securely without any lost motion between the teeth of the pinion I and the teeth of the counterbalancing-pinion J.

In ordinary drilling-machines the weight of the spindle would be sufficient to cause the drill to drop a certain distance, depending upon the distance between the feed-tooth and the tooth of the rack, and consequently the drill would cut into the metal to a depth sufficient to snap the drill. I overcome this objection by providing the extra pinion held against the under side of the teeth of the rack by a spring of sufficient strength to counterbalance the weight of the spindle, as, owing to the counterbalancing of the spindle, the drill will not bite into the metal without pressure being applied to the spindle through the medium of the hand-lever I.

In place of the spring (shown in Fig. 4) a weight may be employed which would answer substantially the same purpose, although not quite so convenient.

The driving-belt for the drill is, in the present instance, a round belt, $m$, which passes over the driving-pulley M on a driving-shaft, N, and under a guiding-pulley, $a'$, around the cone-pulley G, over the pulley $a$, to a pulley, $n$, on a tension-weight, $k$, and up to the pulley M.

By constructing the driving mechanism of the stationary drill in this manner the steady driving of the drill-spindle is insured. As the tension-weight $k$ keeps the belt always under a certain degree of tension, said belt does not have to be taken up at intervals, and the speed of the drill can be changed immediately on placing said driving-belt around any one of the pulleys on the cone G, and, further, the drill need not be set directly in line with the shaft, or in a certain position in respect to the shaft, as the tension-weight $k$ will always accommodate itself to the machine and the driving-pulley.

In Fig. 4 I have shown the driving-pulley M on the standard A. The driving-belt in this instance passes up over a pulley, $a$, around the cone G and over a pulley, $a'$, and then around the pulley $n$ on the friction-weight $k$, up over a supplementary belt-wheel, $l$, and from there around the driving-pulley M. Either one of these forms may be used, as circumstances require.

Having thus described my invention, I claim and desire to secure by Letters Patent—

1. The combination, in a drilling-machine, of the drill-spindle, a rack thereon, and two independent pinions, both engaging with said rack, one pinion adapted to be moved by hand to force the drill to its work and the other pinion acted on by a spring or weight to counterbalance said spindle, substantially as and for the purpose specified.

2. The combination, in a drilling-machine, of the cone-pulley splined directly to the spindle with a belt adapted to pass around guiding-pulleys and around a pulley on a suspended friction-weight and over a stationary driving-pulley, substantially as described.

In testimony whereof I have signed my name to this specification in the presence of two subscribing witnesses.

WILLIAM P. DALLETT.

Witnesses:
HENRY HOWSON,
HARRY SMITH.